US012030658B2

(12) United States Patent
Hedrick (10) Patent No.: US 12,030,658 B2
(45) Date of Patent: Jul. 9, 2024

(54) AIRCRAFT CONTROL FOR ENDURANCE AND FUEL ECONOMY (71) Applicant: INNOVATIVE SOLUTIONS & SUPPORT, INC., Exton, PA (US)

(72) Inventor: Geoffrey S. M. Hedrick, Malvern, PA (US)

(73) Assignee: INNOVATION SOLUTIONS & SUPPORT, INC., Exton, PA (US)

(*) Notice: Subject to any disclaimer, the term of this patent is extended or adjusted under 35 U.S.C. 154(b) by 192 days.

(21) Appl. No.: 17/359,019

(22) Filed: Jun. 25, 2021

(65) Prior Publication Data
US 2021/0403170 A1 Dec. 30, 2021

Related U.S. Application Data (60) Provisional application No. 63/044,801, filed on Jun. 26, 2020.

(51) Int. Cl.
B64D 31/06 (2006.01)
(52) U.S. Cl.
CPC .................... B64D 31/06 (2013.01)
(58) Field of Classification Search
CPC .................................................... B64D 31/08
See application file for complete search history.

(56) References Cited

U.S. PATENT DOCUMENTS 3,363,480 A 1/1968 Murphy
4,312,041 A * 1/1982 DeJonge .............. G01C 23/005
340/963
4,513,235 A 4/1985 Acklam
4,516,063 A 5/1985 Kaye
4,567,786 A 2/1986 Sakurai
(Continued)

FOREIGN PATENT DOCUMENTS

DE 197 12 153 10/1998
EP 0137610 4/1985
(Continued)

OTHER PUBLICATIONS

Search Report and Written Opinion dated Sep. 30, 2021 issued in International Patent Application No. PCT/US21/39182.
(Continued)

Primary Examiner — Arun Goyal
Assistant Examiner — William L Breazeal
(74) Attorney, Agent, or Firm — Cozen O'Connor (57) ABSTRACT An autothrottle of an aircraft is configured to reduce engine power of the aircraft such that the aircraft incrementally slows from a prior airspeed to a reduced airspeed by a first increment, and compare the rates of energy consumption at the prior airspeed and the reduced airspeed. In response to the rate of energy consumption at the reduced airspeed being lower than at the prior airspeed as determined the above operations are repeated. In response to the rate of energy consumption at the reduced airspeed not being less than at the prior airspeed, the autothrottle increases the engine power such that the aircraft incrementally speeds up from a prior airspeed to an increased airspeed by a second increment, the increased airspeed corresponding to a more efficient operating point of the aircraft than any prior airspeed.

20 Claims, 5 Drawing Sheets (56) References Cited

U.S. PATENT DOCUMENTS

| | | | |
|---|---|---|---|
| 5,152,360 | A | 10/1992 | Haefner et al. |
| 5,188,316 | A | 2/1993 | Dressler et al. |
| 5,574,647 | A * | 11/1996 | Liden .................. G05D 1/0005 |
| | | | 701/8 |
| 6,028,280 | A | 2/2000 | Winkler |
| 6,714,155 | B1 * | 3/2004 | Rose ..................... G01S 7/021 |
| | | | 342/107 |
| 6,973,915 | B1 | 12/2005 | Henle |
| 8,195,346 | B1 | 6/2012 | Duerksen et al. |
| 8,855,890 | B2 | 10/2014 | Egle |
| 10,099,795 | B2 | 10/2018 | Hedrick |
| 2005/0150206 | A1 | 7/2005 | Verniau |
| 2007/0150123 | A1 | 6/2007 | Combs |
| 2007/0235594 | A1 | 10/2007 | Wingett et al. |
| 2011/0112705 | A1 | 5/2011 | Antraygue |
| 2012/0018578 | A1 | 1/2012 | Polcuch |
| 2018/0286253 | A1 | 10/2018 | Darnell et al. |
| 2018/0366010 | A1 | 12/2018 | Agam et al. |
| 2019/0047715 | A1 | 2/2019 | Hedrick |
| 2019/0055028 | A1 | 2/2019 | Martindale |

FOREIGN PATENT DOCUMENTS

| | | |
|---|---|---|
| EP | 0265738 | 5/1988 |
| EP | 2826707 | 1/2015 |

OTHER PUBLICATIONS

Roh'lix ® Linear Actuators Binsdocid: XP 55492757A Mar. 26, 2017 4 pages.
https://www.grc.nasa.gov/www/k-12/airplane/ftime.html.
https://www.grc.nasa.gov/www/k-12/airplane/ldrat.html.
https://en.wikipedia.org/wiki/Lift-to-drag_ratio.
http://www.eaa1000.av.org/technicl/perfspds/perfspds.htm.
https://www.flyingmag.com/very-best-speed-fly/.
Search Report dated Apr. 11, 2024 issued in European Patent Application No. 21828331.5.

* cited by examiner

AIRCRAFT CONTROL FOR ENDURANCE AND FUEL ECONOMY

PRIOR APPLICATION

This application claims the benefit of U.S. Provisional Application No. 63/044,801, filed Jun. 26, 2020, and entitled "METHOD OF OPERATING AN AIRCRAFT TO ACHIEVE A MINIMUM FUEL BURN FOR MAXIMUM FLIGHT ENDURANCE," the disclosure of which is incorporated by reference herein.

TECHNICAL FIELD

The invention relates generally to aeronautics and aircraft control and, more particularly, to throttle control for maintaining efficient flight characteristics.

BACKGROUND

The maximum endurance or fuel efficiency for an aircraft depends on a number of factors, including the size and shape of the aircraft, the density of the air, and the flight speed. For a given aircraft, maximum flight endurance is achieved when the aircraft is flown at the most aerodynamically efficient condition. This condition is achieved when the ratio L/D, that is, the ratio of the lift L generated by the aircraft, to the drag D experienced by the aircraft, is maximized. If the airspeed can be adjusted in flight to achieve a maximum L/D ratio, the aircraft may be operated at its maximum endurance and optimal fuel efficiency under the present conditions. Likewise, the range of the aircraft may also be optimized when L/D is at its maximum value.

One way of maximizing L/D is to use aerodynamic analysis to determine, for the aircraft, a standard relationship between indicated airspeed (IAS) and the aircraft weight at various density altitudes. In practice, performing such an aerodynamic analysis is difficult and impractical. For instance, the calculation is subject to weight measurement errors, variations in engine performance and modifications to the aircraft fuselage and the rigging of the aircraft.

SUMMARY OF THE DISCLOSURE

Some aspects of the present subject matter are directed to systems and methods for controlling an aircraft's operating point using closed-loop throttle control, for fuel-efficient flight.

According to one aspect, a system for controlling an autothrottle of an aircraft includes an autothrottle controller having processing circuitry, memory, and input/output facilities. The autothrottle controller is operative to execute instructions including a flight endurance program. An autothrottle actuator is operative to effect a throttle setting that controls engine power of the aircraft in response to an output of the autothrottle controller. The system includes an input to receive signaling from an airspeed sensor that is arranged to measure a current airspeed of the aircraft and to provide the current airspeed to the autothrottle controller. Also, an input is included to receive signaling from an energy consumption sensor that is arranged to measure a rate of energy consumption of at least one engine of the aircraft.

The flight endurance program, when executed, causes the autothrottle controller to reduce the engine power via the autothrottle actuator such that the aircraft incrementally slows from a prior airspeed to a reduced airspeed by a first increment, and compare the rates of energy consumption at the prior airspeed and the reduced airspeed.

In response to the rate of energy consumption at the reduced airspeed being lower than at the prior airspeed, the operations above are repeated. In response to the rate of energy consumption at the reduced airspeed not being less than at the prior airspeed, the engine power is increased via the autothrottle actuator such that the aircraft incrementally speeds up from a prior airspeed to an increased airspeed by a second increment, with the increased airspeed corresponding to a more efficient operating point of the aircraft than any prior airspeed.

Another aspect of the disclosure is directed to an automated method for controlling an autothrottle of an aircraft. According to the method, the autothrottle system reduces engine power of the aircraft such that the aircraft incrementally slows from a prior airspeed to a reduced airspeed by a first increment. The autothrottle system compares the rates of energy consumption at the prior airspeed and the reduced airspeed. In response to the rate of energy consumption at the reduced airspeed being lower than at the prior airspeed, the above operations are repeated. In response to the rate of energy consumption at the reduced airspeed not being less than at the prior airspeed, the autothrottle system increases the engine power such that the aircraft incrementally speeds up from a prior airspeed to an increased airspeed by a second increment, where the increased airspeed corresponds to a more efficient operating point of the aircraft than any prior airspeed.

In another aspect, at least one non-transitory machine-readable medium contains instructions that, when executed by autothrottle controller of an aircraft, causes the autothrottle controller to execute the method summarized above.

Optionally, the system and method may include further comparing the rates of energy consumption at the prior airspeed and the increased airspeed, and in response to the rate of energy consumption at the increased airspeed being lower than at the prior airspeed, increasing the engine power such that the aircraft incrementally speeds up from a prior airspeed to an increased airspeed by a third increment, where this increased airspeed corresponds to a more efficient operating point of the aircraft than any prior airspeed.

In some examples, the first increment is 2 knots, the second increment is 4 knots, and the third increment is 2 knots, though various other values for these increments are also contemplated.

Each rate of energy consumption may be a fuel flow rate or, in the case of electrically-powered aircraft, current supplied to the engine(s).

In some examples, the starting airspeed is a predefined airspeed corresponding to a minimum energy consumption rate of the aircraft at maximum gross weight.

The more efficient operating point of the aircraft may correspond to an airspeed at which the ratio of lift to drag of the aircraft is substantially at its maximum value under present operating conditions of the aircraft.

A number of advantages will become apparent from the following Detailed Description.

BRIEF DESCRIPTION OF THE DRAWINGS

The invention may be more completely understood in consideration of the following detailed description of various embodiments of the invention in connection with the accompanying drawings.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

It should be noted that aspects of this disclosure are applicable in any powered aircraft, including traditional fuel-burning aircraft (propeller-driven, turboprop, jet, or other), electric aircraft (battery-, solar-, or fuel cell-powered), or hybrid-powered aircraft. In the following description, various embodiments are described in the context of one, or some, types of propulsion or propulsion-energy-delivery systems; however, it should be understood that principles of the described embodiments may be suitably applied to other types of aircraft having other propulsion or propulsion-energy-delivery systems with suitable adaptation which is within the skill of aircraft technologists.

Figure 1:
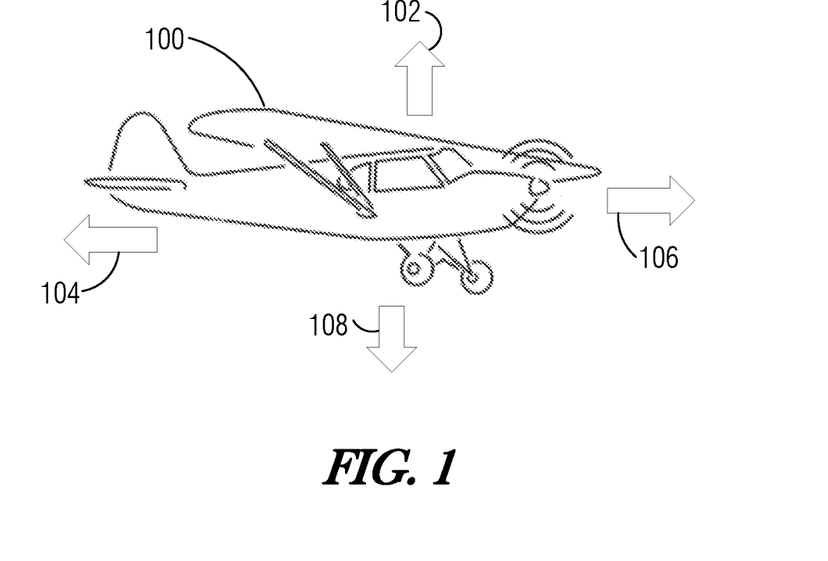
FIG. 1 is a simplified diagram illustrating an aircraft and basic forces involved in its flight.

FIG. 1 is a simplified diagram illustrating aircraft 100 and basic forces involved in its flight. Aircraft 100 generates lift 102 from its forward motion by directing air downward using primarily the shape and orientation of the body of aircraft 100 (e.g., its wings, fuselage, and control surfaces). Lift also depends on the density of the air, the square of the velocity, the air's viscosity and compressibility, the surface area over which the air flows. The dependence on body shape of aircraft 100 is complex and difficult to model mathematically. The effect of inclination of aircraft 100, air viscosity (e.g., due to air temperature, humidity, and altitude), and compressibility on the lift is variable and also difficult to derive for a given operating condition.

Drag 104 is a force that resists the forward motion of aircraft 100. Drag 104 has a number of components, such as aerodynamic friction between the air and the surface of aircraft 100 (skin friction), aerodynamic resistance to the motion of the aircraft 100 through the air (form drag), and drag caused by lift (induced drag), among others, which are likewise difficult to account for in order to compute drag predictively. Like lift 102, drag 104 depends on a number of complex factors, including the size, shape, and weight of aircraft 100, the surface properties of aircraft 100, fluid characteristics of the air, and other parameters. Notably, different parameters of drag 104 prevail at different airspeeds. At low airspeeds, a primary component of drag 104 is the induced drag. As aircraft 100 increases its airspeed, lift 102 is generated more easily, and the induced drag actually reduces. However, with increasing airspeed, the other drag components, collectively referred to as parasitic drag, increase.

Thrust 106 is the propulsion force generated by aircraft 100 to overcome drag 104. Generation of thrust requires consumption of fuel or other onboard energy source (e.g., electrical charge in the case of battery-powered aircraft). The magnitude of the thrust depends on a number of parameters relating to the propulsion system of aircraft 100, such as the type and quantity of engines, and the throttle setting(s). Weight 108 is a combination of gravity and the mass of aircraft 100, including the mass of the airframe, plus the mass of the fuel (which is a time-varying quantity in the case of fuel-consuming aircraft), plus any payload on board aircraft 100 (people, freight, etc., which may also be dynamically-varying as in the case of air-dropping operations). The dynamic variability of weight 108 means that the amounts of lift 102 and drag 104 also vary over time during the flight of aircraft 100.

Figure 2:
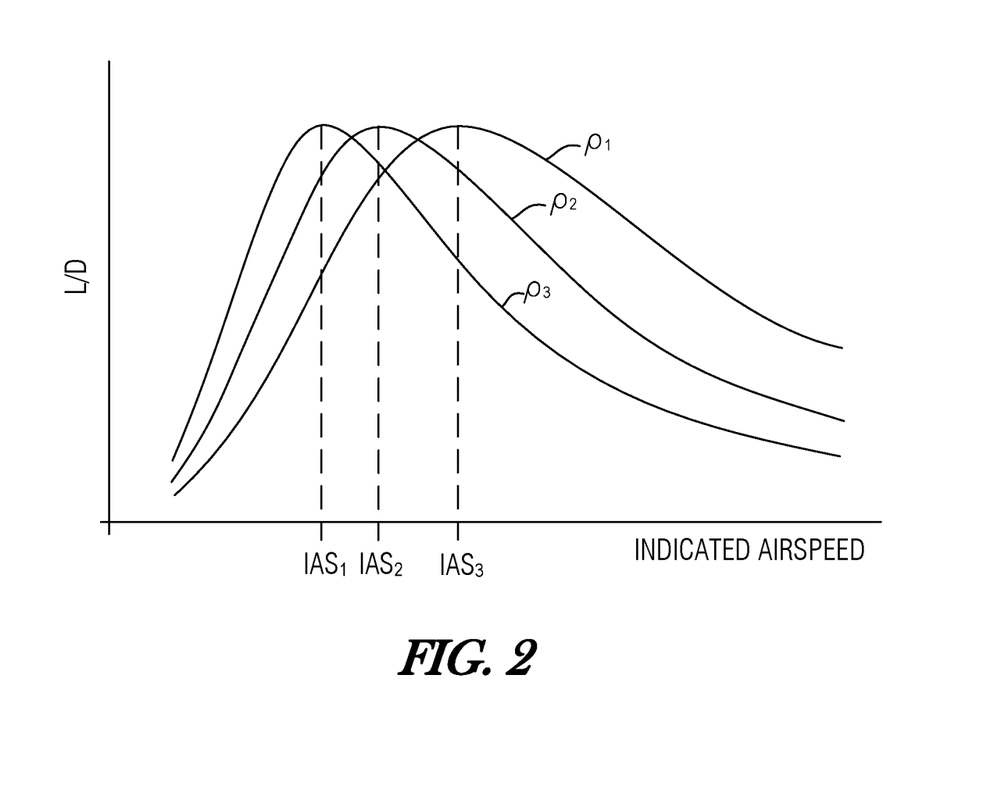
FIG. 2 illustrates the variability of the L/D ratio for a given aircraft as a function of indicated airspeed, and at various altitudes.

Because of the complexity and variability of the forces of both, lift 102 and drag 104, it is difficult for the pilot of aircraft 100 to select an airspeed at the current altitude, weight, and conditions of the air, in order to cruise at the optimal L/D ratio for maximum-endurance flight. In addition, the maximum L/D ratio for aircraft 100 varies based on altitude, since the density of air is highly dependent on altitude. FIG. 2 illustrates the variability of the L/D ratio for a given aircraft 100 as a function of indicated airspeed, and at various altitudes. As shown, the L/D ratio depends on the indicated airspeed, and has a peak value. At higher altitude, where the air has a relatively lower density $r_1$, the L/D ratio has a maximum value at indicated airspeed $IAS_3$. At an intermediate altitude with air density $r_2$, the corresponding L/D curve has its maximum value at indicated airspeed $IAS_2$. At a lower altitude with a correspondingly higher air density $r_3$, the L/D curve has its maximum value at a relatively slower indicated airspeed $IAS_1$.

According to some embodiments, an autothrottle control system is employed in an aircraft to dynamically determine an optimal (or near-optimal) airspeed to achieve the maximum (or near-maximum) L/D ratio under the prevailing conditions. In some implementations, an autothrottle arrangement such as one shown and described in U.S. Pat. No. 10,099,795, the disclosure of which is incorporated by reference herein, may be utilized. In other implementations, other suitable autothrottle arrangements may be used.

Figure 3:
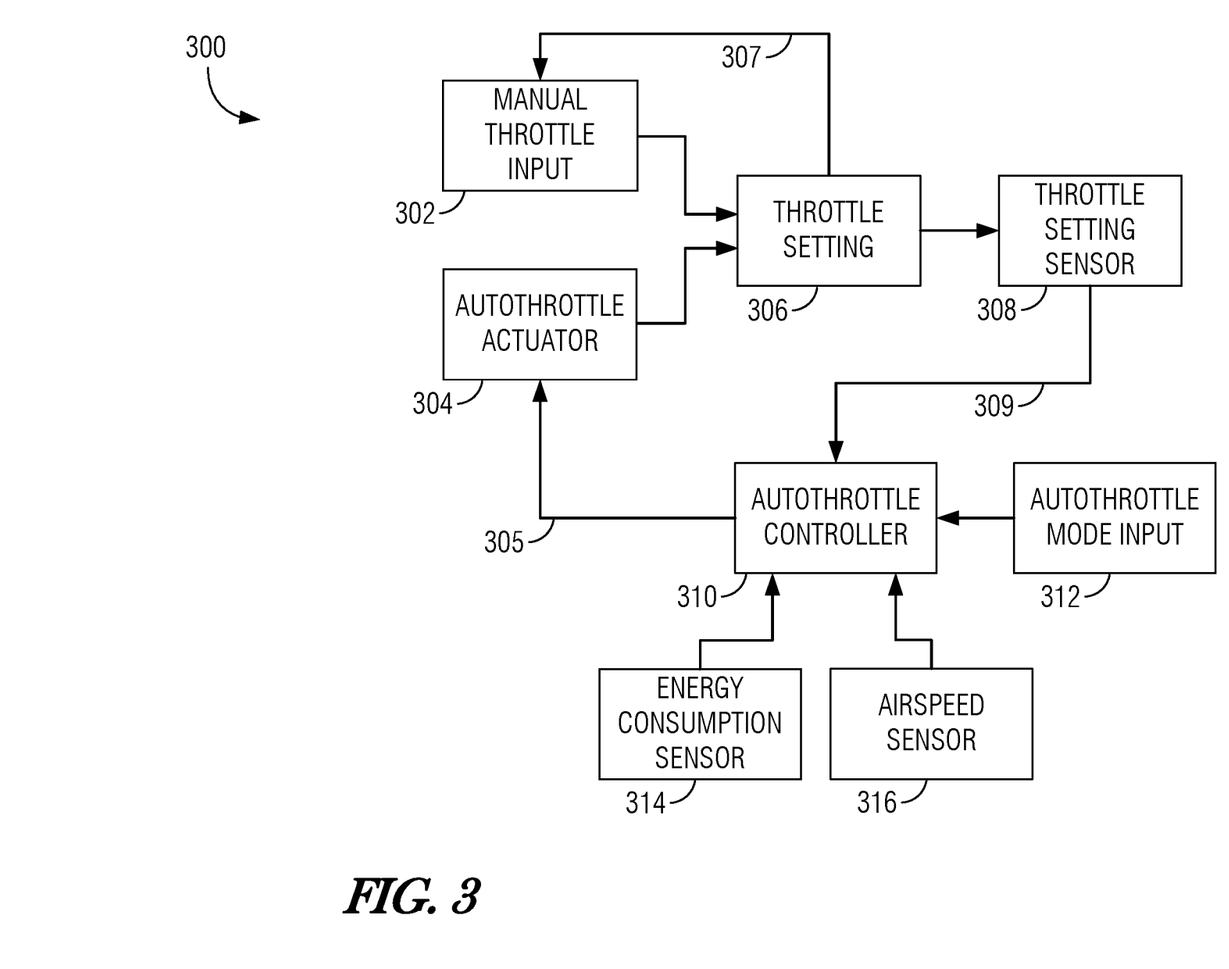
FIG. 3 is a block diagram illustrating an autothrottle control system according to some embodiments.

FIG. 3 is a block diagram illustrating an autothrottle control system 300 according to some embodiments. As depicted, system 300 includes manual throttle input 302, which may take the form of a conventional power-control lever (or set of levers in a multi-engine aircraft) and a suitable operative coupling arrangement to the respective engine(s) and fuel-delivery system(s) of aircraft 100. For example, the operative coupling arrangement may be a mechanical system that regulates the engine power based on the positioning of the respective power-control lever(s). The engine power may be varied by varying the flow of fuel or combustion air to the engine(s). In another example, as in the case of a fly-by-wire arrangement, the operative coupling may include an electrical system that carries command signaling from a pilot control input to an actuator that regulates the engine power (e.g., flow of fuel or combustion air or, in the case of electric aircraft, the delivery of electrical power to the engine(s)) based on the settings provided into the pilot control input.

Autothrottle actuator 304 is a parallel subsystem to manual throttle input 302. Autothrottle actuator 304 automatically regulates the engine power based on command signaling 305 that is generated by autothrottle controller 310. In one example, autothrottle actuator 304 comprises a motor and motor controller, such as a servo motor system, with the rotor of the motor mechanically coupled to manual throttle input 302. In another example, autothrottle actuator 304 is an actuator coupled to the engine(s) or fuel system of aircraft 100, and may include one or more valves for controlling a flow rate of fuel of combustion air to the engine(s). In another example, autothrottle actuator 304 includes one or more switches, transmission gates, or signal amplifiers interfaced with an engine control system of aircraft 100.

Manual throttle input 302 and the output of autothrottle actuator 304 combine to produce throttle setting 306, which is provided as the engine-power input to the engine(s) and fuel system as applicable. The combination of manual throttle input 302 and the output of autothrottle actuator 304 may be achieved mechanically, electromechanically, or electronically, according to various implementations.

In some embodiments, when autothrottle is engaged, autothrottle actuator 304 controls throttle setting 306 in the absence of manual throttle input 302; however, manual throttle input 302, when present, overrides autothrottle actuator 304 to control throttle setting 306. In other embodiments, throttle setting 306 may implement a different combination of manual throttle 302 and autothrottle 304 when both inputs are supplied simultaneously. For instance, autothrottle actuator 304 may be provided to throttle setting as a relatively lower-weighted input, whereas manual throttle input 302 may be provided as a relatively higher-weighted input. In related implementations, a sufficient force is needed at manual throttle input 302 to override autothrottle actuator 304. In other related implementations, throttle setting 306 provides a mechanical force or electronic signal as feedback 307 to manual throttle input 302, such that the effect of autothrottle actuator 304 may be felt or otherwise observed by the pilot at manual throttle input 302.

Throttle setting sensor 308 is arranged to detect the state of throttle setting 306, and provide signal 309 representing that detected state to autothrottle controller 310. Notably, signal 309 represents the effect of manual throttle input 302 on throttle setting 306 when manual throttle input 302 is asserted. In some embodiments, throttle setting sensor 308 is not necessary and may be omitted, for instance, when throttle setting 306 is output as an electronic signal (in which case throttle setting 306 may be fed directly to autothrottle controller 310). Throttle setting sensor 308 may be utilized in embodiments where throttle setting 306 is realized as a mechanical force or motion (such as movement or positioning of a power-control lever, or movement or positioning of a throttle-control cable or associated linkage).

Autothrottle controller 310 produces command signaling 305 for the control of autothrottle actuator 304 based on a plurality of inputs. Autothrottle mode input 312 is controlled by the pilot of aircraft 100, and includes such parameters as engagement/disengagement of autothrottle controller 310, and selection from one or more available autothrottle programs that define the behavior or operational objective of the autothrottle.

Other inputs to autothrottle controller 310 may include energy consumption sensor 314, and airspeed sensor 316. Energy consumption sensor 314 may include one or more fuel-flow sensors, engine torque and speed sensors, sensor(s) arranged to detect the volumetric output of a fuel pump, or a current-measurement arrangement to measure electrical current drawn by one or more electric motors that serve as the engine(s) of aircraft 100. Airspeed sensor 316 may include a pitot-tube differential-pressure measurement arrangement, an anemometer-thermometer measurement arrangement, or other suitable sensor type.

Figure 4:
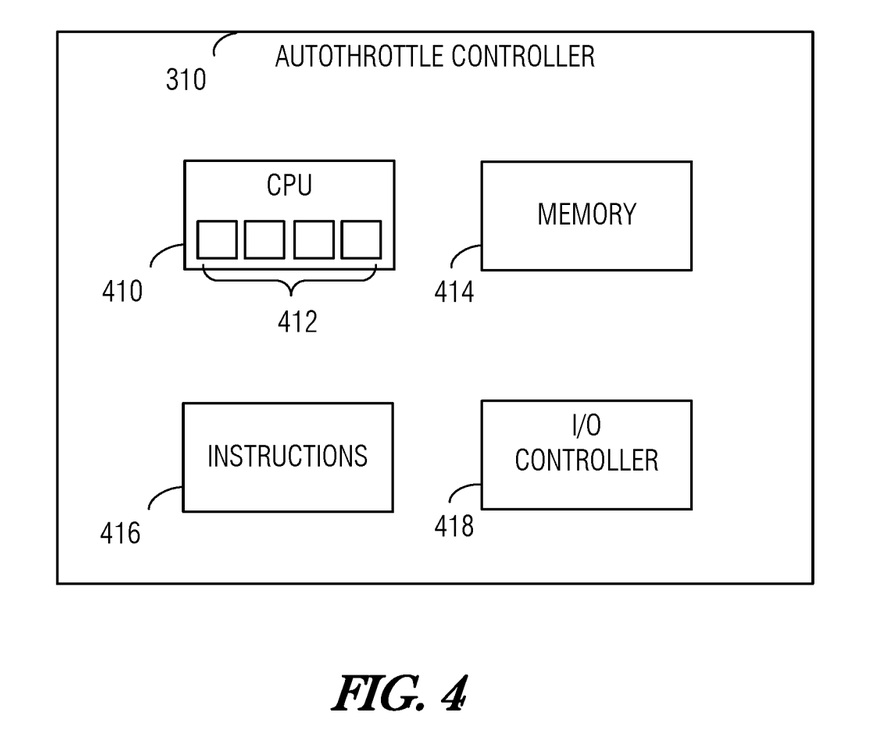
FIG. 4 is a simplified block diagram illustrating components of autothrottle controller according to an example implementation.

FIG. 4 is a simplified block diagram illustrating components of autothrottle controller 310 according to an example implementation. Autothrottle controller 310 includes central processing unit (CPU) 410, which may include one or more processor cores 412. Memory circuitry 414 may include static or dynamic random-access memory (RAM) and a memory controller circuit interfaced with CPU 410. Instructions 416 may be stored on a read-only memory (ROM) device, or an electrically-erasable programmable read-only memory (EEPROM) device such as a flash EEPROM device interfaced with CPU 410 or the memory controller circuit of memory 414. Input/output (I/O) controller 418 includes interfaces to the various inputs and command signaling output 305 described above. In some implementations, I/O controller 418 may include a universal asynchronous receiver/transmitter (UART) for serial communications, a parallel port, analog-to-digital (A/D) converter, or a digital-to-analog converter (D/A). I/O controller 418 may be interfaced with CPU 410 or memory controller of memory 414.

Figure 5:
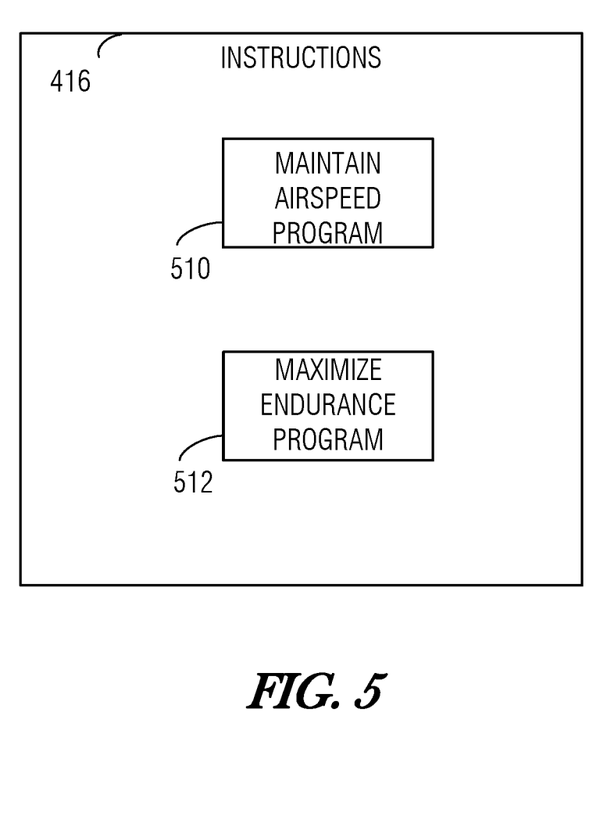
FIG. 5 is a simplified block diagram illustrating portions of certain instructions executable by the autothrottle controller according to some examples.

Autothrottle controller 310 is operative to execute instructions 416 in order to carry out the functionality of autothrottle control system 300. FIG. 5 is a simplified block diagram illustrating portions of instructions 416 according to some examples. In operating autothrottle control system 300 via autothrottle mode input 312, the pilot of aircraft 100 may select from among the available programs. Maintain airspeed program 510 is a set of instructions executable by autothrottle controller 310 for operating autothrottle control system 300 to implement a basic fixed-airspeed control. Program 510 accepts pilot input to set a particular airspeed, which may be set via manual throttle input 302. Thereafter, maintain airspeed program 510 operates autothrottle actuator 304 to increase engine power if the indicated airspeed drops below the set point, and to decrease engine power if the indicated airspeed rises above the set point.

Figure 6:
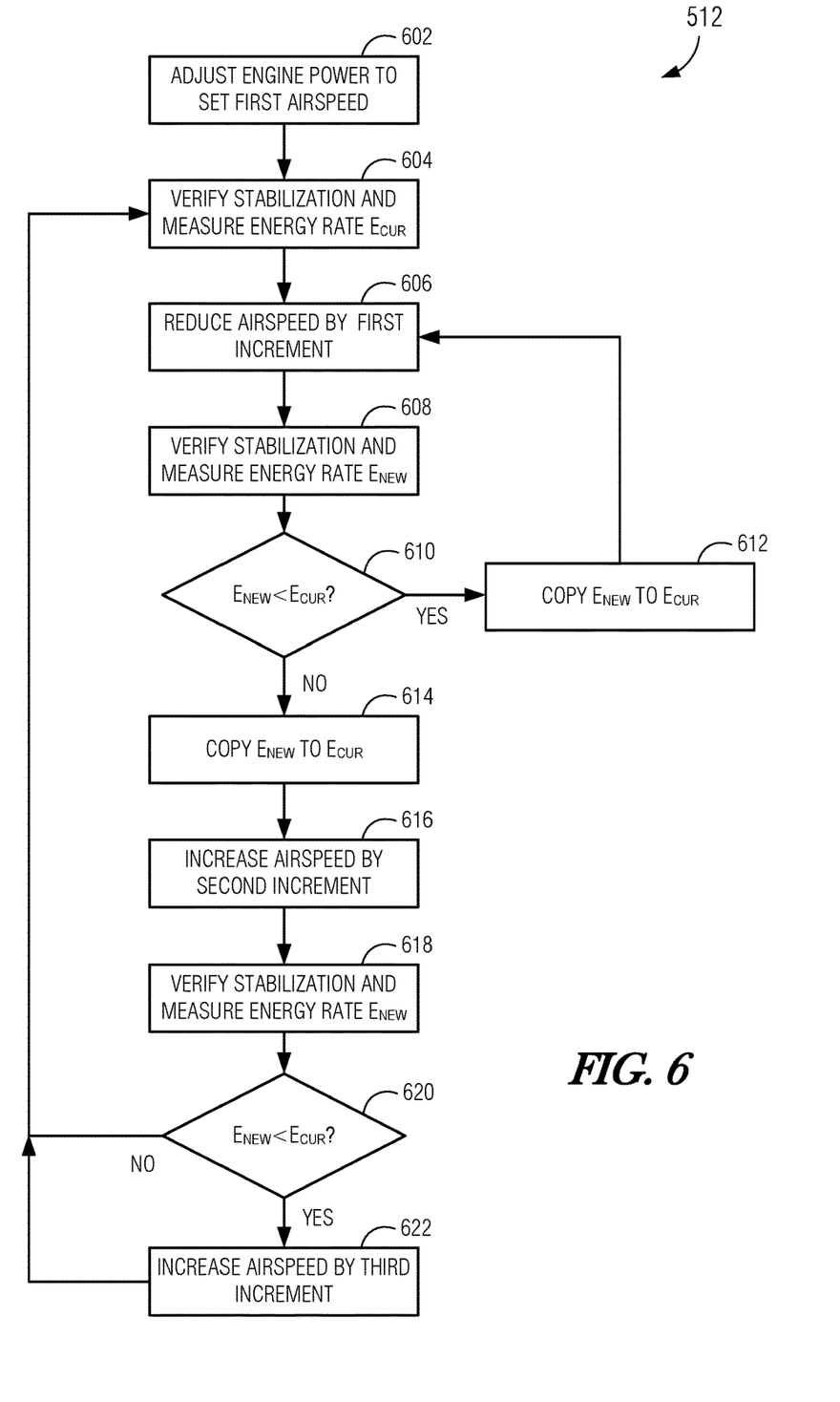
FIG. 6 is a flow diagram illustrating operations in accordance with a program as part of the instructions of FIG. 5 according to some embodiments.

Maximize endurance program 512 is a set of instructions executable by autothrottle controller 310 for operating autothrottle control system 300 to implement a dynamic airspeed control algorithm for determining and maintaining an efficient operating point for aircraft 100 such that the aircraft operates at or near its maximum L/D ratio under the prevailing conditions. FIG. 6 is a flow diagram illustrating operations in accordance with program 512 according to some embodiments. At 602, the engine power is adjusted via throttle setting 306 by autothrottle actuator 304 to set a first airspeed. The first airspeed may be an initial airspeed that is specified for aircraft 100 to provide minimum energy consumption at the maximum gross weight of aircraft 100. The first airspeed may be maintained using maintain airspeed program 510, for instance using airspeed sensor 316 and adjustment of autothrottle actuator 304.

At 604, a sufficient period of time is allowed to lapse to ensure that the operating state of aircraft 100, including the airspeed and rate of energy consumption, such as rate of fuel burn, are at a steady state. This time period may be on the order of 1-5 minutes, nominally, 2 minutes. Thereafter, the current rate of energy consumption $E_{CUR}$ is measured via energy consumption sensor 314. At this point $E_{CUR}$ represents a baseline measurement of energy consumption.

At 606, autothrottle controller 310 causes autothrottle control system 300 to reduce the airspeed by a first increment. The first increment may be a predefined amount of airspeed, such as −2 knots as one example. In various other embodiments, the first increment may be predefined as other values, or it may be dynamically determined based on other factors such as altitude, wing loading, or the like. Accordingly, the engine power is reduced via throttle setting 306 by autothrottle actuator 304, and airspeed sensor 316 may be monitored under closed-loop control, along with any necessary adjustment of throttle setting 306 to arrive at a new steady state at the newly-reduced airspeed. At 608, the stability of steady-state operation is verified (e.g., by waiting for a suitable time duration on the order of 1-5 minutes, nominally 2 minutes, and taking successive measurements of the airspeed via airspeed sensor 316, to ensure that the airspeed has settled at the desired set point within acceptable variation limits). The new rate of energy consumption $E_{NEW}$ is measured via sensor 314.

At 610, program 512 tests whether the new rate of energy consumption $E_{NEW}$ is less than the previous (baseline) measurement $E_{CUR}$. If the result of this comparison is the affirmative case, it indicates that the operating point of aircraft 100 was at an airspeed above the speed associated with the maximum L/D ratio, and the airspeed may need to be further reduced to find the maximum L/D ratio. Accordingly, program 512 branches to operation 612, where the new rate of energy consumption $E_{NEW}$ is copied to $E_{CUR}$ to become the new baseline value. Further, program 512 loops back to operation 606, where the airspeed is again reduced by the first increment, followed by operations 608-610.

Operations 606-612 are repeated until the measured rate of energy consumption increases with the most recent decrease in airspeed. This result indicates that the airspeed has been reduced to a point below the speed corresponding to the maximum L/D ratio. Accordingly, the process advances to 614, where a new baseline is set by copying $E_{NEW}$ to $E_{CUR}$. Next, at 616, the airspeed is increased by a second increment. The second increment may be a predefined or dynamically-determined value, such as +4 knots. Accordingly, the engine power is increased via throttle setting 306 by autothrottle actuator 304, and airspeed sensor 316 may be monitored under closed-loop control, along with any necessary adjustment of throttle setting 306 to arrive at a new steady state at the newly-increased airspeed. At this point, aircraft 100 will be operating substantially at its minimum energy utilization point. In the present context, substantially at the minimum energy utilization point means within +/−5% of the minimum energy utilization point under the present operating conditions of aircraft 100.

As an optional further optimization according to some embodiments, at 618, the stability of steady-state operation is verified (e.g., by waiting for a suitable time duration on the order of 1-5 minutes, nominally 2 minutes, and taking successive measurements of the airspeed via airspeed sensor 316, to ensure that the airspeed has settled at the desired set point within acceptable variation limits). Also, the new rate of energy consumption $E_{NEW}$ is measured via sensor 314.

At 620, program 512 tests whether the new rate of energy consumption $E_{NEW}$ at the higher airspeed is less than the previous (baseline) measurement $E_{CUR}$. If the result of this comparison is negative, it indicates that the operating point of aircraft 100 is at approximately the airspeed corresponding to the maximum L/D ratio, meaning that aircraft 100 is at or near its minimum energy utilization and hence at its operating point for maximum endurance. However, if the result of the test at 620 is the affirmative case, this indicates that the operating point of aircraft 100 was at an airspeed below the speed associated with the maximum L/D ratio, and the airspeed may need to be further increased to find the maximum L/D ratio. Accordingly, at 622, the airspeed is increased by a third increment, such as +2 knots. At this point, aircraft 100 will be operating substantially at its minimum energy utilization point. In the present context, substantially at the minimum energy utilization point means within +/−5% of the minimum energy utilization point under the present operating conditions of aircraft 100.

The process may loop back to 604 to re-run the optimization routine as the prevailing flight conditions may change due to utilization of fuel and lightening of aircraft 100, changes in altitude, or other factor. This additional cycling of program 512 may be executed continuously, or periodically after passage of a predefined amount of time.

The embodiments above are intended to be illustrative and not limiting. Additional embodiments are within each claim that does not expressly exclude such subject matter. In addition, although aspects of the present invention have been described with reference to particular embodiments, those skilled in the art will recognize that changes may be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents apply only to the incorporated subject matter, and not to any of the subject matter directly present herein.

For purposes of interpreting the claims for the present invention, it is expressly intended that the provisions of 35 U.S.C. § 112(f) are not to be invoked unless the specific terms "means for" or "step for" are recited in a claim.

What is claimed is:

1. An automated method for controlling an autothrottle of an aircraft, the automated method comprising:
   (a) by an autothrottle system, reducing engine power of the aircraft such that the aircraft incrementally slows from a prior airspeed to a reduced airspeed by a first increment;
   (b) comparing, by the autothrottle system, a rate of energy consumption at the prior airspeed and a rate of energy consumption at the reduced airspeed;
   (c) in response to the rate of energy consumption at the reduced airspeed being lower than the rate of energy consumption at the prior airspeed as determined in (b), repeating (a) and (b);
   (d) in response to the rate of energy consumption at the reduced airspeed not being less than the rate of energy consumption at the prior airspeed, increasing the engine power, by the autothrottle system, such that the aircraft incrementally speeds up from the reduced airspeed to an increased airspeed by a second increment, wherein the increased airspeed corresponds to a more efficient operating point of the aircraft than any prior airspeed.

2. The automated method of claim 1, further comprising:
(e) in response to (d), comparing, by the autothrottle system, the respective rate of energy consumption at the prior airspeed and the rate of energy consumption increased airspeed;
(f) in response to the rate of energy consumption at the increased airspeed being lower than the rate of energy consumption at the prior airspeed as determined in (e), increasing the engine power, by the autothrottle system, such that the aircraft incrementally speeds up from the increased airspeed to a further increased airspeed by a third increment.

3. The automated method of claim 2, wherein the first increment is 2 knots, the second increment is 4 knots, and the third increment is 2 knots.

4. The method of claim 1, wherein each rate of energy consumption is a fuel flow rate.

5. The method of claim 1, wherein the prior airspeed in (a) is a predefined airspeed corresponding to a minimum energy consumption rate of the aircraft at a maximum gross weight of the aircraft.

6. The automated method of claim 1, wherein the more efficient operating point of the aircraft corresponds to an airspeed at which a ratio of lift to drag of the aircraft is substantially at a maximum value under present operating conditions of the aircraft.

7. The method of claim 1, further comprising:
after (a) and prior to (b), waiting, by the autothrottle system, for a time sufficient for the aircraft to stabilize energy consumption at the reduced airspeed.

8. A system for controlling an autothrottle of an aircraft, the system comprising:
an autothrottle controller including processing circuitry, memory, and input/output facilities, the autothrottle controller operative to execute instructions including a flight endurance program;
an autothrottle actuator operative to effect a throttle setting that controls engine power of the aircraft in response to an output of the autothrottle controller;
an input operative to receive signaling from an airspeed sensor that is arranged to measure a current airspeed of the aircraft and to provide the current airspeed to the autothrottle controller; and
an input operative to receive signaling from an energy consumption sensor that is arranged to measure a rate of energy consumption of at least one engine of the aircraft; wherein the flight endurance program, when executed, causes the autothrottle controller to:
(a) reduce the engine power via the autothrottle actuator such that the aircraft incrementally slows from a prior airspeed to a reduced airspeed by a first increment;
(b) compare a rate of energy consumption at the prior airspeed and a rate of energy consumption at the reduced airspeed;
(c) in response to the rate of energy consumption at the reduced airspeed being lower than the rate of energy consumption at the prior airspeed as determined in (b), repeat (a) and (b);
(d) in response to the rate of energy consumption at the reduced airspeed not being less than the rate of energy consumption at the prior airspeed, increase the engine power via the autothrottle actuator such that the aircraft incrementally speeds up from the reduced airspeed to an increased airspeed by a second increment, wherein the increased airspeed corresponds to a more efficient operating point of the aircraft than any prior airspeed;
(e) repeat (a)-(d) such that the airspeed is controlled to track the more efficient operating point.

9. The system of claim 8, wherein the flight endurance program, when executed, further causes the autothrottle controller to:
(f) in response to (d), compare the rate of energy consumption at the prior airspeed and the rate of energy consumption at increased airspeed;
(g) in response to the rate of energy consumption at the increased airspeed being lower than the rate of energy consumption at the prior airspeed as determined in (f), increase the engine power such that the aircraft incrementally speeds up from the increased airspeed to a further increased airspeed by a third increment.

10. The system of claim 9, wherein the first increment is 2 knots, the second increment is 4 knots, and the third increment is 2 knots.

11. The system of claim 8, wherein the energy consumption sensor is a fuel consumption sensor and wherein the energy consumption rate is a fuel flow rate.

12. The system of claim 8, wherein the prior airspeed in (a) is a predefined airspeed corresponding to a minimum energy consumption rate of the aircraft at a maximum gross weight of the aircraft.

13. The system of claim 8, wherein the more efficient operating point of the aircraft corresponds to an airspeed at which a ratio of lift to drag of the aircraft is substantially at a maximum value under present operating conditions of the aircraft.

14. The system of claim 8, wherein the flight endurance program, when executed, further causes the autothrottle controller to:
after (a) and prior to (b), wait for a time sufficient for the aircraft to stabilize energy consumption at the reduced airspeed.

15. At least one non-transitory machine-readable medium comprising instructions that, when executed by an autothrottle controller of an aircraft, causes the autothrottle controller to:
(a) reduce engine power of the aircraft such that the aircraft incrementally slows from a prior airspeed to a reduced airspeed by a first increment;
(b) compare a rate of energy consumption at the prior airspeed and a rate of energy consumption at the reduced airspeed;
(c) in response to the rate of energy consumption at the reduced airspeed being lower than the rate of energy consumption at the prior airspeed as determined in (b), repeat (a) and (b);
(d) in response to the rate of energy consumption at the reduced airspeed not being less than the rate of energy consumption at the prior airspeed, increase the engine power such that the aircraft incrementally speeds up from a latest prior airspeed to an increased airspeed by a second increment, wherein the increased airspeed corresponds to a more efficient operating point of the aircraft than any prior airspeed
(e) repeat (a)-(d) such that the airspeed is controlled to track the more efficient operating point.

16. The at least one non-transitory machine-readable medium of claim 15, wherein the instructions, when executed, further cause the autothrottle controller to:

(f) in response to (d), compare the rate of energy consumption at the prior airspeed and the rate of energy consumption at the increased airspeed;

(g) in response to the rate of energy consumption at the increased airspeed being lower than the rate of energy consumption at the prior airspeed as determined in (f), increase the engine power such that the aircraft incrementally speeds up from the increased airspeed to a further increased airspeed by a third increment.

17. The at least one non-transitory machine-readable medium of claim 16, wherein the first increment is 2 knots, the second increment is 4 knots, and the third increment is 2 knots.

18. The at least one non-transitory machine-readable medium of claim 15, wherein each rate of energy consumption is a fuel flow rate.

19. The at least one non-transitory machine-readable medium of claim 15, wherein the prior airspeed in (a) is a predefined airspeed corresponding to a minimum energy consumption rate of the aircraft at a maximum gross weight of the aircraft.

20. The at least one non-transitory machine-readable medium of claim 15, wherein the more efficient operating point of the aircraft corresponds to an airspeed at which the ratio of lift to drag of the aircraft is substantially at a maximum value under present operating conditions of the aircraft.

\* \* \* \* \*